July 17, 1962     J. V. SHOEMAKER     3,044,834
WHEEL COVER
Filed June 19, 1958     3 Sheets-Sheet 1
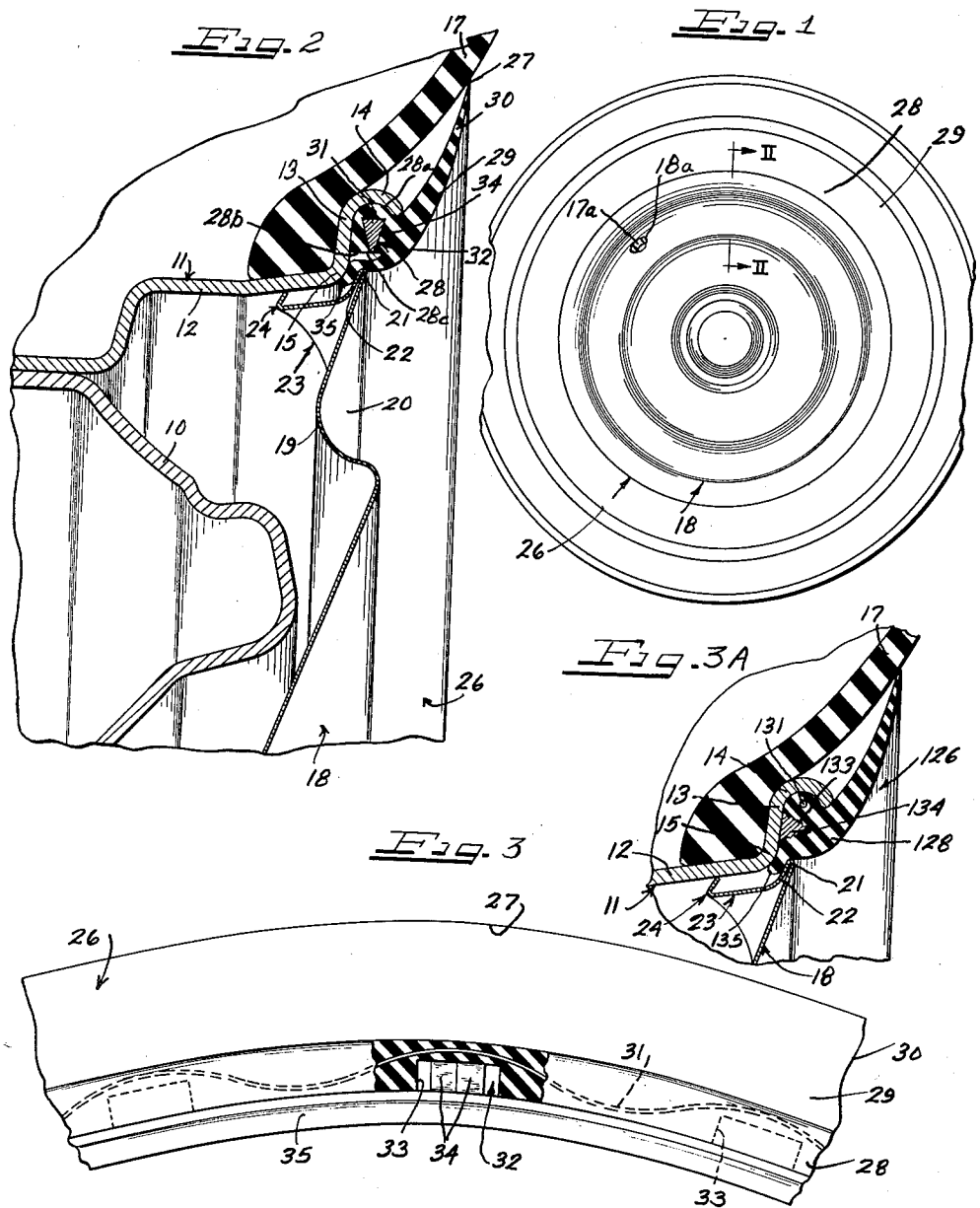
Inventor
JOHN V. SHOEMAKER July 17, 1962 J. V. SHOEMAKER 3,044,834
WHEEL COVER
Filed June 19, 1958 3 Sheets-Sheet 2

Inventor
JOHN V. SHOEMAKER
by Hill, Sherman, Meroni, Gross & Simpson Attys.

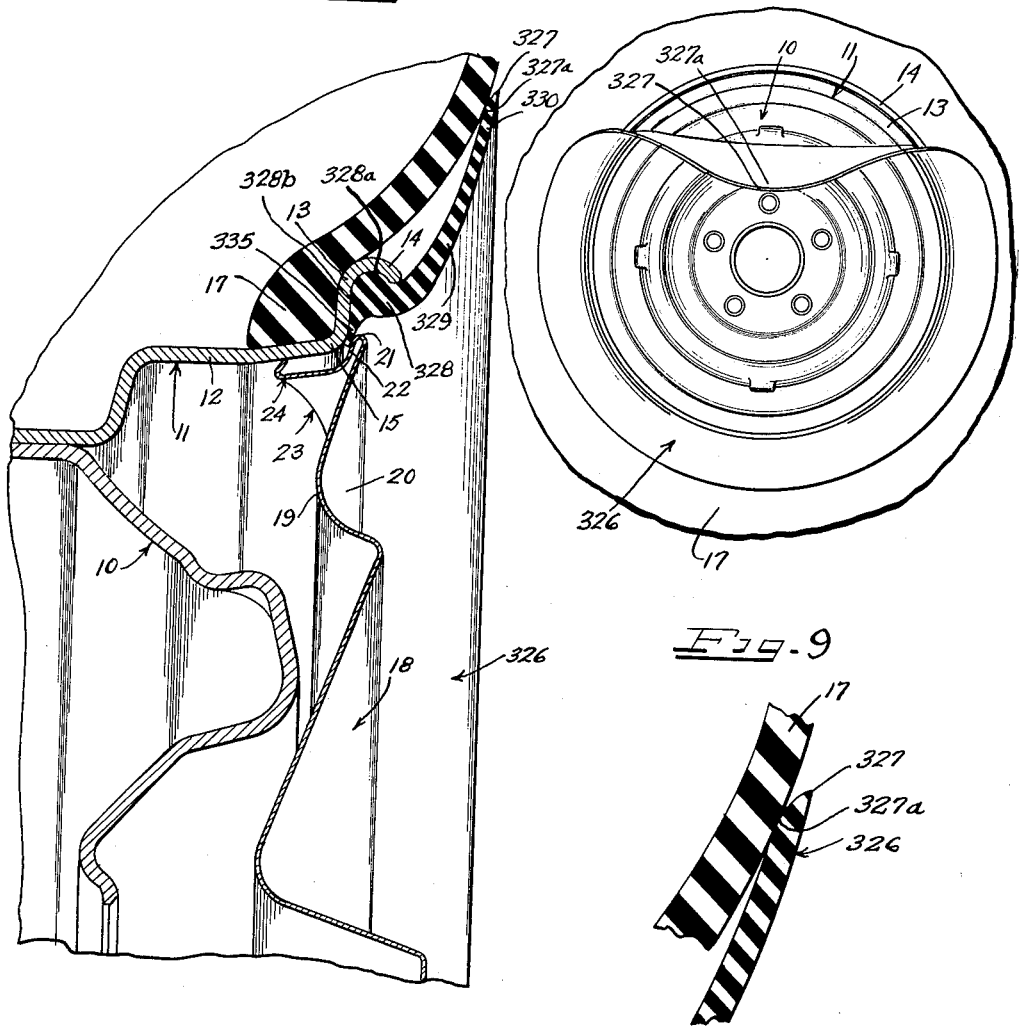

United States Patent Office 3,044,834
Patented July 17, 1962

3,044,834
WHEEL COVER
John V. Shoemaker, Detroit, Mich., assignor to Lyon Incorporated, Detroit, Mich., a corporation of Delaware
Filed June 19, 1958, Ser. No. 743,043
11 Claims. (Cl. 301—37)

The present invention relates to improvements in wheel structures and more particularly concerns the provision of novel means for providing a wheel with a simulated white side wall for a tire on the wheel.

For ornamental purposes, automobile tires are commonly provided with white side walls, the remainder of the tire being of a more or less black appearance. The white rubber used for the white side wall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white side walls, generally resulting in a sacrifice of quality in the tire.

To overcome the disadvantages of cure compromise, it has been proposed to secure the white side wall portion or veneer to the side wall of the tire after the tire has been vulcanized. Such after-attached side wall members are inherently liable to such disadvantages as peeling, and the like, and of course require a separate attaching or vulcanizing operation that raises costs.

It has also been heretofore proposed to provide separate simulated white side wall ring members that are secured between the terminal flange of the tire rim and the bead portion of the tire and separably hug the side wall of the tire. Such simulated or mock tire white side wall rings require, of course, that the tire be deflated in order to install the ring members. Should such simulated white side wall rings become damaged, it is necessary to deflate the tire not only to remove the damaged ring but also to replace the ring. Furthermore, a disadvantage of such simulated white side wall rings is that, especially with tubeless tires there is interference with proper sealing, gripping engagement of the tire bead portion with the opposing surfaces of the tire rim. More particularly, when the simulated white side wall ring is clampingly interposed between the terminal rim flange and the inner tire side wall bead, interference with proper sealing of a tubeless tire may occur.

It is accordingly an important object of the present invention to overcome the foregoing difficulties and disadvantages of the prior expedients and to provide a simulated tire white side wall of improved appearance and which can be applied, or removed, or replaced without disturbing the tire.

Another object of the invention is to provide an improved tire side wall simulating member which serves also as means for covering the tire rim terminal flange as well as concealing wheel balancing weights that may be carried by such flange.

A further object of the invention is to provide a novel tire side wall simulating ring member which is adapted for optional assembly with a wheel cover for disposition over the outer side of the wheel.

Yet another object of the invention is to provide a tire side wall simulating flexible ring device which is adapted to be carried in clamped engagement with the outer side of a tire rim.

It is a further object of the invention to provide cushioning means for a wheel cover, also adapted for providing a simulated tire side wall.

According to the general features of the present invention there is provided a tire side wall ring simulating member having spring means embedded within the inner margin of the ring member which means cooperates with the inner margin in maintaining the ring member in retained assembly upon a vehicle wheel.

According to still other features of the present invention a tire side wall ring simulating member is provided with an inner margin having a recessed area defined by circumferentially spaced pockets each of which are adapted to receive a wheel balancing weight therein, and which weights are sustained in assembly by various means within the pockets.

Other objects, features and advantages of the present invention will be readily apparent from the following detailed description of certain preferred embodiments thereof, taken in conjunction with the accompanying drawings in which:

FIGURE 1 is an outer side elevation of a wheel structure embodying features of the present invention;

FIGURE 2 is an enlarged fragmentary radial sectional detail view taken substantially on the line II—II of FIGURE 1 looking in the direction indicated by the arrows;

FIGURE 3 is an enlarged fragmentary rear elevation of the tire side wall ring simulating member in full and dotted lines and with a portion thereof broken away to show the details thereof;

FIGURE 3a is an enlarged fragmentary radial sectional detail view similar to FIGURE 2 only illustrating a modified form of the invention;

FIGURE 7 is a side elevation of a wheel structure similar to FIGURE 1 but illustrating another modified form;

FIGURE 8 is an enlarged fragmentary cross-sectional view similar to FIGURE 2 only showing the modified cover structure of FIGURE 7; and FIGURE 9 is an enlarged cross-sectional view showing the coaction between the ring and the tire.

Figure 4:
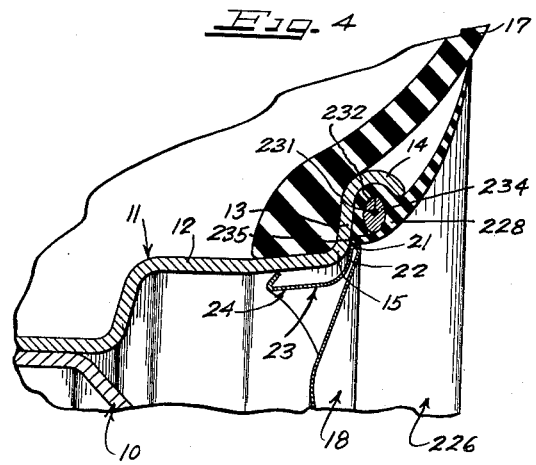
FIGURE 4 is a radial cross-sectional detail view similar to FIGURES 2 and 3a but showing a further modification.

Referring to FIGURES 1, 2, 3a, 4, 6 and 8, an automobile wheel including a disk spider wheel body 10 supports a tire rim 11 including an intermediate generally axially extending rim flange 12, a generally radially extending rim flange 13, and an arcuate generally axially extending rim flange 14. As is apparent from the drawings, the rim flanges 12 and 14 each define generally radially inwardly facing rim surfaces and the rim flange 13 defines a generally axially outwardly facing rim surface. The rim flanges 12 and 13 are provided with a juncture shoulder indicated generally at 15.

A pneumatic tire 17 of preferably the tubeless type is carried by the tire rim which tire may be inflated by inserting air within the valve stem 17a (FIGURE 1).

For disposition at the outer side of the wheel and in covering relation to the wheel body 10, as well as substantially covering relation to the tire rim 11, there is provided a wheel cover 18. To this end, the cover 18 includes an intermediate annular dished portion 19 radially outwardly of which is a generally radially and axially outwardly projecting annular marginal portion 20 of a diameter to axially overlie the rim juncture shoulder 15.

The outer annular marginal portion 20 is underturned providing an annular underturned shoulder area indicated at 21 which is in turn connected to a generally radially and axially inwardly extending inner marginal cover portion 22 which underlies the outer annular marginal portion 21. Connected to the radially inner end of the inner marginal portion 22 is a suitable cover retaining structure indicated generally at 23 which retaining structure may include return bent type retaining fingers 24 which may be of the type shown in Lyon Patent No. 2,707,449, issued on May 3, 1955. As illustrated the retaining structure includes the circumferentially spaced retaining fingers 24 each of which are resiliently deflectable into and out of cover retaining engagement with the intermediate rim flange 12. The retaining action is brought about by virtue of the fact that the cover is formed of a relatively resilient material and further because the fingers 24 normally lie in a circle having a diameter slightly in excess of the inside diameter of the intermediate rim flange 12 so that when the cover is pressed to the wheel the fingers 24 are all deflected radially inwardly into biting engagement with the intermediate rim flange 12. The cover 18 may be made from any suitable material such as spring steel and the like.

The foregoing description is applicable to all three forms of the present invention.

For affording the appearance of the tire 17 having a white or colored side wall, a ring member 26 (FIGURES 1–3) is provided which preferably is made from a rubber-like material and for which a synthetic rubber such as butyl is especially desirable. Such synthetic rubber is characterized by especially desirable form sustaining resilient flexibility, good color qualities and excellent durometer control.

For affording tire side wall simulating shape for the ring member 26, it is of generally axially outwardly curved transverse or radial shape terminating in a thin, and in this instance substantially feather edge radially outer extremity 27 engageable against the side wall of the tire 17 with a fine line generally merging effect so that the ring member appears on the wheel as though it were an integral side wall portion of the tire. The outside diameter of the ring member 26 at the tire engaging edge 27 thereof, in this instance, is such that the edge 27 engages the tire side wall on the incurve of the outer side wall, with a substantial side wall portion radially outwardly beyond the point of contact disposed in protective overlying relation to the side wall ring member.

The ring member 26 includes a radially inner ring margin 28, an intermediate arcuate portion 29 which is adapted to be bridged over the terminal rim 14, and an outer marginal ring portion 30 which terminates in the feather edge 27.

The ring at its radially inner margin 28 is provided with means for retaining inter-engagement with the tire rim 11 including rim flanges 13 and 14 as well as with the wheel cover member 18. To this end, the inner margin of the ring member 26 is constructed as an annular flange which is received within the cavity defined by the rim flanges 13 and 14. The inner margin 28 is provided with edges having a configuration generally corresponding to the configuration of the rim edges against which they are to abut. As is apparent from FIGURE 2 the ring member 26 is thickest at its inner margin 28 with the thickness of the ring member progressively diminishing in a radially outwardly direction and with the ring member suitably at its radially outer tip terminating in a fine line edge 27. This construction affords the ring member with a desirable degree of deflectability so that the outer edge 27 may be placed under a slight degree of tension with the tire side wall when engaged on the wheel.

Molded or embedded internally of the inner ring margin 28 is spring means indicated generally at 31 which is in the form of an undulated compression spring as is evident from FIGURE 3. The spring 31 is adapted to be flexed with the radially inward displacement of the ring margin to thereby radially outwardly urge the ring margin 28 into snug rim engagement. The spring 31 may be annular, or may comprise a split ring.

The spring or wire structure 31 is adapted to aid in holding or sustaining the shape of the inner ring margin at the area where the ring is to be engaged against the wheel. The wire structure is also adapted to cooperate with the inner ring margin when the inner ring margin is deflected for maintaining the inner ring margin in removable assembly with the tire rim. In this respect it will be appreciated that the inner ring margin 28 is possessed of an inner ring margin surface 28a which normally has a diameter slightly larger than the inside diameter of the rim flange 14 so that when the inner ring margin 28 is deflected and engaged with the terminal rim flanges 13 and 14 the ring surface 28a will snugly engage within the pocket defined by the arcuate rim flange 14.

The inner ring margin 28 is possessed of a recessed area indicated generally at 32 which recessed area is comprised of circumferentially spaced pockets 33 each of which are of a triangular cross-sectional shape or a V-shape. The bottom of the V is disposed at the radially inner edge 28b of the ring margin 28 which inner edge 28b is possessed of spreadable lips 28c which are disposed on opposite sides of the bottom of the V so that when the lips are spread apart access is provided to the pocket 33.

For disposition inside of the pockets 33 are triangularly shaped wheel balancing weights 34. As will be noted in FIGURE 3 each of the pockets 33 is made oversize so that it may accommodate more than one of the wheel balancing weights 34. It will be further appreciated that the pocket is possessed of an inside dimension slightly smaller than the peripheral dimension of the triangular weights 34 so that when the weights are disposed within the pockets 33 the wall area defining the pockets will snugly engage against the wheel balancing weights to help resist displacement of the weights therefrom. To insert the weights 34 within the pocket 33 the lips 28c of each of the pockets are spread and the weight is moved into the pocket 33. The weight 34 need not be inserted all the way into the pocket 33 since the centrifugal force created through the rotation of the wheel will to some extent cause the weights to move radially outwardly in a manner whereby the weights are self seating balance weights.

Connected to the inner ring margin 28 is an annular ring flap 35 which flap serves a multiple number of functions. The flap 35 operates to absolutely preclude the weights 34 from falling out of the pockets 33. The flap 35 also provides means whereby the ring member 26 may be clamped to the wheel by the outer margin 20 of the cover 18. The flap 35 serves the additional function of preventing dirt from collecting at the area between the wheel balancing weights and the cover so that the dirt from the wheel may be moved radially outwardly from the center of the wheel without being collected within any pocket area.

To assemble the ring 26 and the wheel cover 18 upon the wheel the ring inner margin 28 is seated along a portion of its inner periphery and is deflected inwardly and allowed to be moved axially inwardly whereupon it is released in a manner whereby the ring surface 28a is snugly engaged with the inside surface of the annular rim flange 14. The balancing weights 34 may be inserted either before or after the ring member 26 is engaged upon the wheel. This may be brought about merely by manipulating the annular flap 35 so as to provide access to the pockets 33 in the manner previously described.

The cover may then be assembled on the wheel by aligning cover opening 18a with the valve stem 17a and by pressing the cover axially inwardly in a manner whereby the retaining extensions or fingers 24 are deflected radially inwardly and into biting gripping engagement with the intermediate rim flange 12. The cover 18 is suitably in this instance pressed axially against the wheel in a manner whereby the outer cover margin 20 and more particularly the inner annular ring marginal portion 22 as well as the shoulder 21 are engaged against the flap 35 in a manner whereby the flap 35 is held snugly in bottomed engagement against the rim shoulder 15.

The cover may be removed by inserting a pry-off tool underneath the outer margin and prying the cover away from the wheel. The ring member may be removed either by grasping the outer marginal ring area 30 and pulling the same radially inwardly to disengage the inner ring margin 28 from the tire rim. As an alternative procedure, the flap 35 may be manually grasped and pulled radially inwardly to disengage the inner ring margin 28 from the wheel.

In FIGURE 3a is shown a modified tire side wall ring simulating member 126. The ring member 126 has a modified inner ring margin construction indicated generally at 128. The inner ring margin 128 is provided with axially inwardly opening circumferentially spaced pockets 133 each of which are adapted to receive wheel balancing weights which are indicated generally at 134. These weights differ from the weights shown in the first form in that they are each provided with a roughed surface area to increase the amount of friction which may be developed between the wheel balancing weights and the inner ring margin so that the weights will not be readily accidently displaced from the inner ring margin. It will further be noted that when the inner ring margin 128 is engaged against the wheel that the widest portion of the triangular wheel balancing weight is abutted against the radial rim flange 13.

The ring member 126 is further provided with an annular flange or flap portion 135 which emanates from the axially innermost side of the ring margin 128 as opposed to the first form of the invention wherein the flap 35 emanated from the axially outer area of the ring margin 128. A savings in material is brought about by this construction.

The ring 126 is also provided with spring means 131 which operates in the same manner as spring 31 in the first form shown in FIGURES 1–3.

The cover 18 cooperates with the ring flange portion 135 in much the same manner as in the first form of the invention in a manner whereby when the flap portion 135 is bottomed against the rim juncture 15 the weights 134 are sustained in abutment against the radial rim flange 13.

Figure 5:
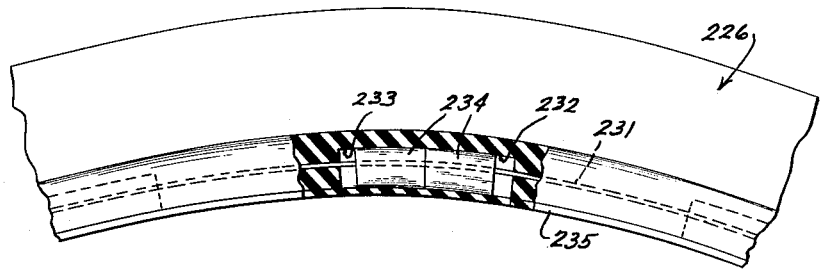
FIGURE 5 is an enlarged fragmentary rear elevation similar to FIGURE 3 but showing the ring member depicted in FIGURE 4.
Figure 6:
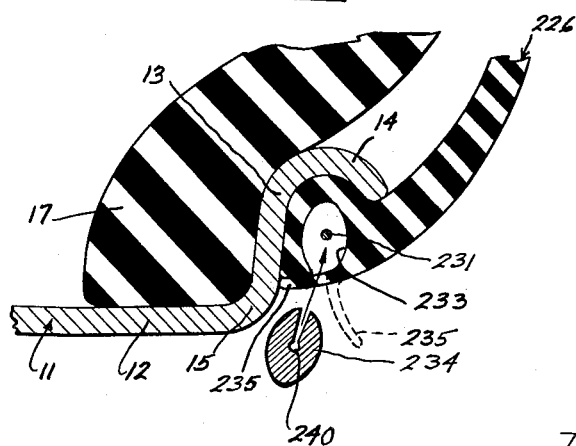
FIGURE 6 is an enlarged fragmentary cross-sectional view similar to FIGURE 4 but showing diagrammatically in full and dotted lines the manner in which the wheel balancing weights may be inserted within the pockets in the rim member.

In FIGURES 4–6 is shown a still further modified tire side wall ring construction 226. To this end, the ring member 226 includes an inner ring margin 228 which has spring means 231.

The inner ring margin 228 is also provided with a recessed area 232 which is comprised of a series of circumferentially spaced pockets 233 (FIGURES 5 and 6) which are of much the same construction as the pockets shown in FIGURE 2 except that the pockets shown in FIGURES 4–6 are generally oblong in cross-section. The spring means or wire 231 is adapted to extend circumferentially through the pockets 233. Contained within the pockets are wheel balancing weights 234 each of which have a key-hole type slot 240 enabling the weight to be moved radially into the pocket with the wire being engaged within the key-hole slot 240 to interlock or hook the weight to the wire to prevent accidental disassembly of the weight from the inner ring margin.

The inner ring margin 228 is also provided with an annular flap 235 which operates to extend radially across the open end of the pocket to form a closure member for the pockets in much the same manner as in the first form of the invention.

When the ring member 226 is in assembly upon the wheel the annular cover shoulder 21 is adapted to engage against the annular flap 235 in a manner whereby the flap 235 is pressed radially outwardly into snug engagement with the inner ring margin 221 so as to preclude any movement of the flap 235 and to lock the weights 234 within the pockets 233.

The wheel balancing weights 234 may be inserted into the pockets 233 in much the same manner as previously described in connection with the ring member 26 and the spring means 231 comprises a spring which is circular in form and may be either annular or a split ring.

The ring members 126 and 226 may be assembled and removed from the wheel in much the same manner as described in the first form of the invention. It will be appreciated that in all forms the ring member is of the self-sustaining type in that the ring members are adapted to sustain themselves upon the wheel and the cover merely operates to further clamp or lock the ring on the tire rim. The spring means in FIGURES 1–6 when deflected creates a pressure which cooperates with the centrifugal force applied through the weights to maintain the side wall ring member on the tire rim.

Shown in FIGURES 7, 8 and 9 is another type of modified tire side wall ring construction indicated generally at 326. In the present instance, as compared to the previous forms of the invention, it is contemplated that the ring member 326 be comprised of a flexible material such as synthetic plastic of a suitable type such as polyethylene. A polyethylene type of ring member 326 is relatively flexible but has practically a non-existent or small stretch factor thereby decreasing the likelihood of the ring from accidentally disengaging from the rim.

The ring member 326 includes an inner ring margin 328, an intermediate bridging portion 329 and an outer marginal ring portion 330. The inner ring margin 328 is possessed of an arcuate ring surface 328a for nesting snug engagement with the inside surface of the terminal ring flange 14. The ring member 326 may be applied to the wheel by radially inwardly displacing the inner ring margin 328. Since the inner ring margin 328 is comprised of a material having a very small stretch factor snug engagement will be brought about between the ring member 326 and the tire rim 11. When the ring member 326 is in assembly upon the wheel the arcuate inner ring margin surface 328a and ring margin surface 328b are frictionally engaged with the rim flanges 13 and 14 to thereby sustain the sidewall ring member in assembly upon the wheel.

The inner ring margin 328 has on its radially inner side an annular projection 335 against which the underturned portion 22 of the cover 18 is adapted to be applied. The engagement of the cover against the projection 335 operates to bottom the radially inner end of the ring margin surface 328b against the tire rim flange 13. The inner ring margin is sustained in assembly with the terminal rim flange 14 mainly as a consequence of the centrifugal force developed during the rotation of the wheel as well as the forces created as a consequence of the radially inward displacement of the inner ring margin 328.

The outer ring margin 330 includes an outer tip edge 327 which is radially and axially outwardly arched away from the tire side wall 17 and away from the tire engaging surface area of the sidewall ring member indicated at 327a. It will be appreciated that by axially displacing the relatively sharp tip 327 axially outwardly of the wheel grooving of the tire sidewall will be prevented. In the past it has been found that the tip 327 has a tendency to create a groove in the tire sidewall 17 so as to detract from the utility of the tire 17 as well as the ornamental appearance thereof.

The tire sidewall ring member 326 may be removed from the wheel after the cover member 18 has been pried from the wheel by grasping the outer marginal edge area 327 and pulling the ring member 326 away from the wheel. It will be appreciated that the stretching of the ring member 326 has been exaggerated to some extent in FIGURE 7.

It will be understood that modifications and variations may be effected without departing from the scope of the novel concepts of the present invention.

I claim as my invention:

1. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, a recessed area disposed in the inner ring margin for receipt of a wheel balancing weight therein, and a wheel balancing weight retainingly lodged and sustained in assembly with the recessed area of the inner ring margin, said inner ring margin having a flap area overlapping the recessed area for concealing the weight and assisting in maintaining the wheel balancing weight in assembly with the ring member.

2. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, a recessed area disposed in the inner ring margin for receipt of a wheel balancing weight therein, and a wheel balancing weight retainingly lodged and sustained in assembly with the recessed area of the inner ring margin, said recessed area defining an expandable pocket normally sized slightly smaller than the wheel balancing weight insertable therein for snug engagement with the wheel balancing weight when engaged within the expandable pocket.

3. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, a recessed area disposed in the inner ring margin for receipt of a wheel balancing weight therein, and a wheel balancing weight retainingly lodged and sustained in assembly with the recessed area of the inner ring margin, said recessed area defining an expandable pocket normally sized slightly smaller than the wheel balancing weight insertable therein for snug engagement with the wheel balancing weight when engaged within the expandable pocket, said pocket being triangular in cross-section having peaked edges with the open end of the pocket where the weights may be inserted being at one of the peaked edges.

4. The wheel structure of claim 3 further characterized by said recessed area defining a pocket opening axially inwardly with the weight being insertable therein enabling the weight to be sustained in abutment against the tire rim, and a wheel cover structure having means for retaining itself on the wheel and with a portion of the cover structure bearing against the inner annular margin for sustaining the weight in abutment against the tire rim.

5. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, a recessed area disposed in the inner ring margin for receipt of a wheel balancing weight therein, and a wheel balancing weight retainingly lodged and sustained in assembly with the recessed area of the inner ring margin, said weight having a roughed peripheral surface area engageable within the recessed area to further resist accidental disassembly from the ring member.

6. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, wire means embedded in the inner ring margin for cooperating with the inner ring margin for maintaining the inner ring margin in removable assembly with the terminal rim flange, and a recessed area in the inner ring margin and a wheel balancing weight retainingly lodged in assembly within the recessed area.

7. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, wire means embedded in the inner ring margin for cooperating with the inner ring margin for maintaining the inner ring margin in removable assembly with the terminal rim flange, and a recessed area in the inner ring margin and a wheel balancing weight retainingly lodged in assembly within the recessed area, said weight having means for retainingly grasping the wire means which wire means extends through the recessed area.

8. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, wire means embedded in the inner ring margin for cooperating with the inner ring margin for maintaining the inner ring margin in removable assembly with the terminal rim flange, and a recessed area in the inner ring margin and a wheel balancing weight retainingly lodged in assembly within the recessed area, said inner ring margin having a deflectable flap extending across an open area of the recessed area to aid in holding the wheel balancing weight within the recessed area.

9. In a wheel structure including a tire rim having a terminal rim flange and a pneumatic tire mounted on the tire rim, a non-metallic tire side wall ring simulating member spaced from and bridged over the terminal rim flange for concealing the terminal rim flange and with the ring member having an outer ring margin adapted for engagement against the tire radially outwardly of the terminal rim flange and with the ring member having an inner annular margin adapted for abutment against the tire rim, a recessed area disposed in the inner ring margin for receipt of a wheel balancing weight therein, a wheel balancing weight retainingly lodged and sustained in assembly with the recessed area of the inner ring margin, said inner ring margin having a flap area overlapping the recessed area for concealing the weight and assisting in maintaining the wheel balancing weight in assembly with the ring member, and a wheel cover structure having means for retaining itself upon the wheel and with a portion of the wheel cover structure engaged against the flap area precluding the flap from movement in order that the weight will be sustained within the recessed area.

10. A non-metallic tire side wall ring simulating member for bridging over a terminal rim flange for concealing a terminal rim flange and with the ring member having an outer ring margin adapted for engagement against a tire radially outwardly of a terminal rim flange and with the ring member having an inner annular margin adapted for abutment against a tire rim, said inner ring margin having a recessed area defining circumferentially spaced pockets for receiving wheel balancing weights in assembly therein, and wheel balancing weights carried in said pockets, each of said pockets being defined by a side wall area having a peripheral dimension normally slightly smaller than the weight so the weight may be snugly engaged when inserted within the pocket.

11. The ring simulating member of claim 10 further characterized by the inner ring margin having wire means embedded therein for cooperating with the inner ring margin for maintaining the inner ring margin in removable assembly with a terminal rim flange, said wire means comprising a spring which extends across the circumferentially spaced pockets, and at least one wheel balancing weight disposed in one of said pockets having means retainingly grasping the spring.

References Cited in the file of this patent

UNITED STATES PATENTS

| | | |
|---|---|---|
| 2,082,803 | Lyon | June 8, 1937 |
| 2,242,430 | Kraft | May 20, 1941 |
| 2,269,670 | Kieckbusch | Jan. 13, 1942 |
| 2,421,384 | Lyon | June 3, 1947 |
| 2,431,701 | Lyon | Dec. 2, 1947 |
| 2,443,627 | Lyon | June 22, 1948 |
| 2,447,021 | Lyon | Aug. 17, 1948 |
| 2,624,634 | Lyon | Jan. 6, 1953 |
| 2,707,449 | Lyon | May 3, 1955 |
| 2,862,769 | Wood | Dec. 2, 1958 |
| 2,937,902 | Barnes | May 24, 1960 |

FOREIGN PATENTS

| | | |
|---|---|---|
| 1,061,278 | France | Nov. 23, 1953 |